United States Patent
Wu et al.

(10) Patent No.: US 7,610,420 B2
(45) Date of Patent: Oct. 27, 2009

(54) DATA AGGREGATION-DISTRIBUTION APPARATUS, DATE TRANSMISSION SYSTEM AND METHOD THEREOF

(75) Inventors: Chang-Lien Wu, Zhubei (TW);
Yin-Hsin Tsai, Hsinchu County (TW)

(73) Assignee: Realtek Semiconductor Corp., Hsinchu (TW)

(*) Notice: Subject to any disclaimer, the term of this patent is extended or adjusted under 35 U.S.C. 154(b) by 173 days.

(21) Appl. No.: 11/797,372

(22) Filed: May 3, 2007

(65) Prior Publication Data
US 2007/0283074 A1 Dec. 6, 2007

(30) Foreign Application Priority Data
Jun. 6, 2006 (TW) .............................. 95120078 A

(51) Int. Cl.
*G06F 13/42* (2006.01)
*G06F 3/00* (2006.01)
(52) U.S. Cl. .................... 710/106; 710/52; 710/105
(58) Field of Classification Search .............. 710/106, 710/52, 105
See application file for complete search history.

(56) References Cited

U.S. PATENT DOCUMENTS

| | | | | |
|---|---|---|---|---|
| 5,687,388 A * | 11/1997 | Wooten et al. | ................. | 710/3 |
| 5,908,455 A * | 6/1999 | Parvahan | ..................... | 701/29 |
| 5,960,216 A * | 9/1999 | Vishlitzky et al. | ............. | 710/74 |
| 6,725,302 B1 * | 4/2004 | Benayoun et al. | ............. | 710/62 |
| 6,901,471 B2 * | 5/2005 | Govindaraman | ............ | 710/305 |
| 7,191,255 B2 * | 3/2007 | Wong et al. | ..................... | 710/5 |
| 7,373,431 B2 * | 5/2008 | Kondo | ............................ | 710/2 |
| 2007/0286102 A1* | 12/2007 | Shimokawa et al. | ........ | 370/310 |
| 2008/0254818 A1* | 10/2008 | Nitsche | ....................... | 455/501 |

* cited by examiner

*Primary Examiner*—Mark Rinehart
*Assistant Examiner*—Jeremy S Cerullo
(74) *Attorney, Agent, or Firm*—Thomas, Kayden, Horstemeyer & Risley

(57) ABSTRACT

A data aggregation-distribution apparatus includes a plurality of port route units and a data processing unit. Every port route unit has a sending buffer and a receiving buffer. The data processing unit has a data aggregation unit and a data distribution unit. The data aggregation unit and the data distribution unit are used to increase the bandwidth of a communication system.

20 Claims, 8 Drawing Sheets

First part

Second part

DATA AGGREGATION-DISTRIBUTION APPARATUS, DATE TRANSMISSION SYSTEM AND METHOD THEREOF

BACKGROUND OF THE INVENTION

1. Field of the Invention

The present invention relates to a communication system and, more particularly, to a communication system capable of increasing data transmission bandwidth.

2. Description of the Prior Art

It is well known that Universal Serial Bus 2.0 (USB 2.0) performs an operational mode of half duplex. The data transmission rate of USB 2.0 is limited to 480 Mbps, which is far below the data transmission rate of Peripheral Component Interconnect (PCI) and Peripheral Component Interconnect Express (PCI Express). Consequently, based on the data transmission bandwidth of USB 2.0, data transmission rate of any electronic device having transmission interface compatible with USB 2.0 is limited to 480 Mbps.

For instance, data transmission bandwidths of USB OTG (On-The-Go) and WiMedia-MBOA have same limit of 480 Mbps due to compatibility with USB 2.0. Furthermore, although the wireless communication technology of Ultra WideBand (UWB) adopted for creating a wireless USB standard is capable of performing operations having features of high bandwidth and low power consumption, the data transmission rate of the wireless communication technology of UWB is also limited to 480 Mbps due to its compatible with USB 2.0. Accordingly, there is a big need for providing higher data transmission bandwidth.

For that reason, the present invention provides an apparatus and related method for increasing data transmission bandwidth to solve the aforementioned problems.

SUMMARY OF THE INVENTION

It is therefore one of objectives of the present invention to provide a transmission interface system and related method for increasing data transmission rate and solving the prior art problems.

In accordance with an objective of the present invention, a data aggregation-distribution apparatus, which can be installed in a host terminal and a remote device terminal, is provided for increasing data transmission bandwidth between the host terminal and the remote device terminal. The input signals and the output signals of the data aggregation-distribution apparatus communicated between the host terminal and the remote device terminal are based on a Universal Serial Bus (USB) standard.

In addition, the present invention provides a data transmission system for performing communication operations based on wired or wireless USB data transmission between the host terminal and the remote device terminal to achieve higher data transmission bandwidth.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

The above and other objects and features of the present invention will become apparent from the subsequent description of preferred embodiments given in conjunction with the following accompanying drawings.

DETAILED DESCRIPTION OF THE PREFERRED EMBODIMENT

Hereinafter, preferred embodiments of the present invention will be described in detail with reference to the accompanying drawings. Please note that, for the sake of clarity, same devices in different preferred embodiments described below are marked with same label number. Here, it is to be noted that the present invention is not limited thereto.

Figure 2:
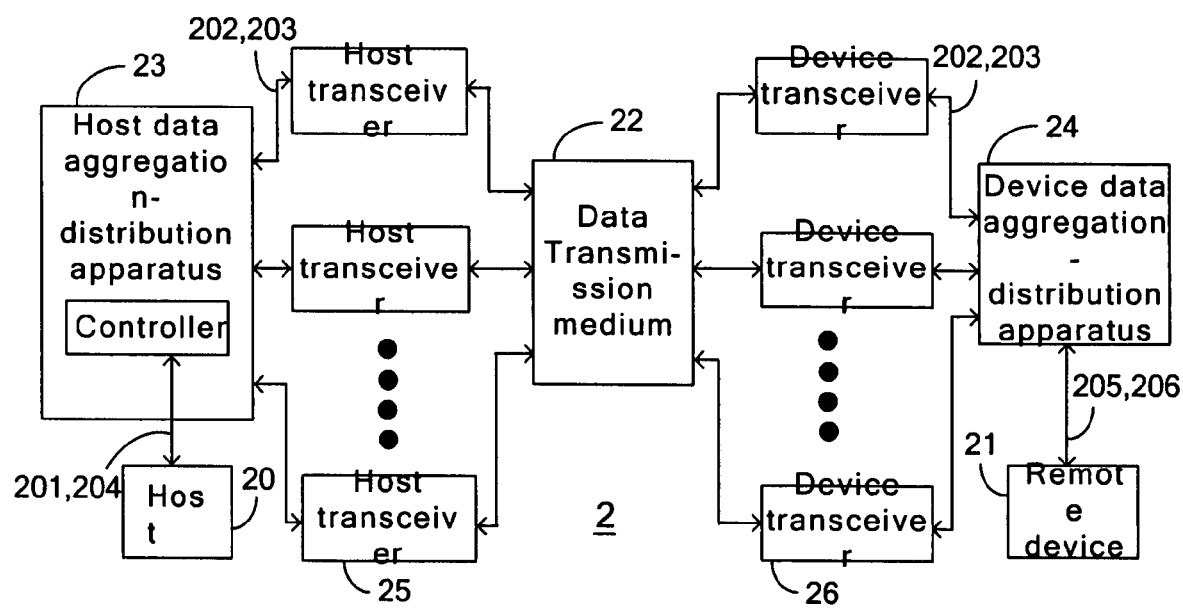
FIG. 2 sets forth a schematic diagram of a data transmission system according to the present invention.

Please refer to FIG. 2. FIG. 2 shows a schematic diagram of a data transmission system 2 according to the present invention. The data transmission system 2 in FIG. 2 provides data transmission means between a host 20 and a remote device 21. The data transmission system 2 comprises a data transmission medium 22, host transceivers 25, device transceivers 26, a host data aggregation-distribution apparatus 23 and a device data aggregation-distribution apparatus 24.

The device transceivers 26 are electrically connected to the host transceivers 25 through the data transmission medium 22. The host data aggregation-distribution apparatus 23 is electrically connected to the host 20 and the host transceivers 25. The host data aggregation-distribution apparatus 23 receives a first data signal 201 and converts the first data signal 201 into a plurality of second data signals 202. The second data signals 202 are than furnished to the host transceivers 25 and are transmitted to the device transceivers 26 by the host transceivers 25 over the data transmission medium 22. Moreover, the host data aggregation-distribution apparatus 23 can receive a plurality of third data signals 203 and converts the third data signals 203 into a fourth data signal 204.

The device data aggregation-distribution apparatus 24 is electrically connected to the remote device 21 and the device transceivers 26. The device data aggregation-distribution apparatus 24 receives a fifth data signal 205 and converts the fifth data signal 205 into the third data signals 203. The third data signals 203 are than furnished to the device transceivers 26 and are transmitted to the host 20 through the device transceivers 26 and the host transceivers 25. Furthermore, the device data aggregation-distribution apparatus 24 can receive the second data signals 202 and converts the second data signals 202 into a sixth data signal 206.

Based on an USB 2.0 standard for an exemplary embodiment, the data transmission rate of the third data signal 203 and the second data signal 202 is 480 Mbps. Therefore, the data transmission rate of the first data signal 201 and the fourth data signal 204 is M×480 Mbps, where M is the number of host transceivers 25 being used. Correspondingly, the data transmission rate of the fifth data signal 205 and the sixth data signal 206 is N×480 Mbps, where N is the number of device transceivers 26 being used. In other words, the data transmission rate between the host 20 and the host data aggregation-distribution apparatus 23 is M×480 Mbps, and the data transmission rate between the remote device 21 and the device data aggregation-distribution apparatus 24 is N×480 Mbps.

The data transmission medium 22 may comprise a plurality of transmission lines or a wireless transmission channel. Each of the plurality of transmission lines or the wireless transmission channel is coupled to one of the plurality of host transceivers 25 and to one of the plurality of device transceivers 26, respectively.

The host data aggregation-distribution apparatus 23 comprises a controller so as to communicate with the host 20 for data transmission through an interface. The controller is an USB controller if the interface is an USB interface. The USB controller can be an Enhanced Host Controller Interface (EHCI) controller, an Open Host Controller Interface (OHCI) controller, or a Universal Host Controller Interface (UHCI) controller.

The controller is a wireless USB controller if the interface is a wireless USB interface. The wireless USB controller can be a Wireless Host Controller Interface (WHCI) controller. The controller will be complied with WiMedia-MBOA (Multiband OFDM Alliance) if the interface is an interface complied with WiMedia-MBOA. That is to say, the controller for data transmission can be any controller corresponding to any interface that is currently used or still under development.

The host data aggregation-distribution apparatus 23 performs data transmission operations with the plurality of host transceivers (USB PHY) 25 through an USB 2.0 Transceiver Macrocell Interface (UTMI) if the plurality of host transceivers 25 are USB PHY transceivers. Other currently-used interfaces (ex: UTMI+, ULPI (UTMI+ low-pin interface)) related other interface standards can also be applied to achieve the embodiment.

After the host data aggregation-distribution apparatus 23 is initialized, bus enumeration operation is performed to renew topology information. Furthermore, after the bus enumeration operation is performed, the host data aggregation-distribution apparatus 23 is able to detect whether or not a remote device terminal being electrically connected is equipped with a device data aggregation-distribution apparatus 24 or has functionality of data aggregation-distribution operations.

Consequently, the host data aggregation-distribution apparatus 23 is able to perform data aggregation-distribution operations in conjunction with a device data aggregation-distribution apparatus 24 based on a preset transmission protocol if the remote device terminal is equipped with a device data aggregation-distribution apparatus 24 or has functionality of data aggregation-distribution operations. However, the host data aggregation-distribution apparatus 23 performs data transmission operations for communicating with remote device based on commercialized transmission protocol, such as USB 2.0 or USB 1.1, if the remote device terminal is not equipped with a device data aggregation-distribution apparatus 24 or has no functionality of data aggregation-distribution operations.

Figure 1:
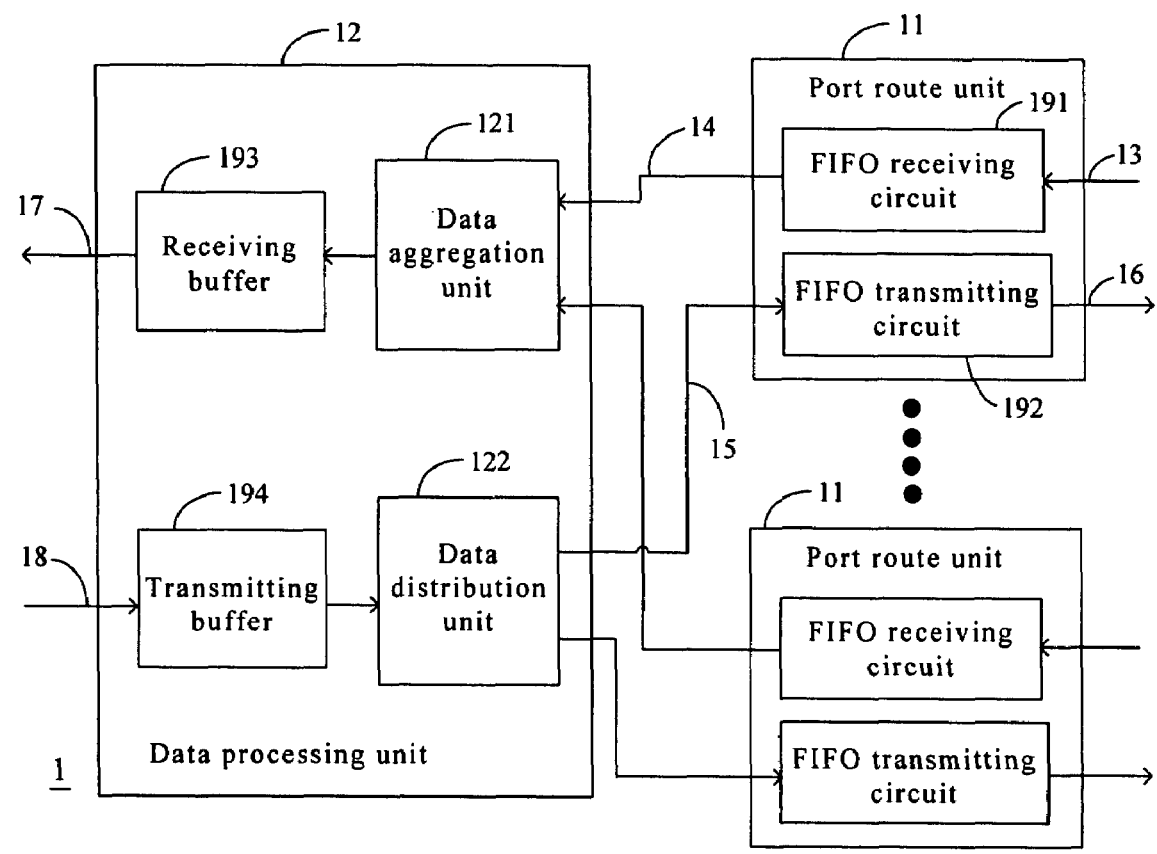
FIG. 1 is a schematic diagram illustrating a data aggregation-distribution apparatus according to the present invention.

Please refer to FIG. 1. FIG. 1 is a schematic diagram of a data aggregation-distribution apparatus of the present invention, which is shown as a functional block diagram of a data aggregation-distribution circuit 1. As is shown in FIG. 1, the data aggregation-distribution circuit 1 comprises a plurality of port route units 11 and a data processing unit 12. According to one embodiment of the present invention, each of the plurality of port route units 11 receives a data signal 13 from one of the plurality of host transceivers 25. The data signal 13 is temporarily stored in the corresponding port route unit 11 and is then forwarded to the data processing unit 12 as a data signal 14. Moreover, each of the plurality of port route units 11 receives a data signal 15 from the data processing unit 12. The data signal 15 is temporarily stored in the corresponding port route unit 11 and is then forwarded to one of the plurality of host transceivers 25 as a data signal 16. In an embodiment of the present invention, the data transmission rate corresponding to the data signals 13, 14, 15 and 16 is 480 Mbps if data transmission operation between each of the plurality of port route units 11 and the corresponding host transceiver 25 is processed through an UTMI interface.

The data processing unit 12 comprises a data aggregation unit 121 and a data distribution unit 122. The data aggregation unit 121 transmits a data signal 17 to an external apparatus, such as a host 20 shown in FIG. 2, with a data transmission rate of N×480 Mbps, where N is the number of host transceivers 25 being electrically connected to the data processing unit 12. Similarly, the data distribution unit 122 receives a data signal 18 from an external apparatus, such as a host 20 shown in FIG. 2, with a data transmission rate of N×480 Mbps, where N is still the number of host transceivers 25 being electrically connected to the data processing unit 12.

There are a variety of methods to increase transmission bandwidth while retaining compatibility with current standards or devices. For instance, increasing data path width, clocking the data processing unit 12 with an operation clock having a frequency being N times of the frequency of the clock used by the host transceivers 25, taking advantage of a plurality of parallel I/O channels, or mixing the aforementioned methods are all able to increase transmission bandwidth while retaining compatibility with current standards or devices.

The port route unit 11 comprises a First In First Out receiving circuit (RX FIFO) 191 and a First In First Out transmitting circuit (TX FIFO) 192 for storing data temporarily. The data processing unit 12 may further comprise a receiving buffer 193 and a transmitting buffer 194 for storing data temporarily if necessary. The transmission bandwidths corresponding to different transceivers are not necessarily the same. Consequently, the problems caused by different bandwidths of different transceivers being used can be solved by the aforementioned buffers.

Figure 3:
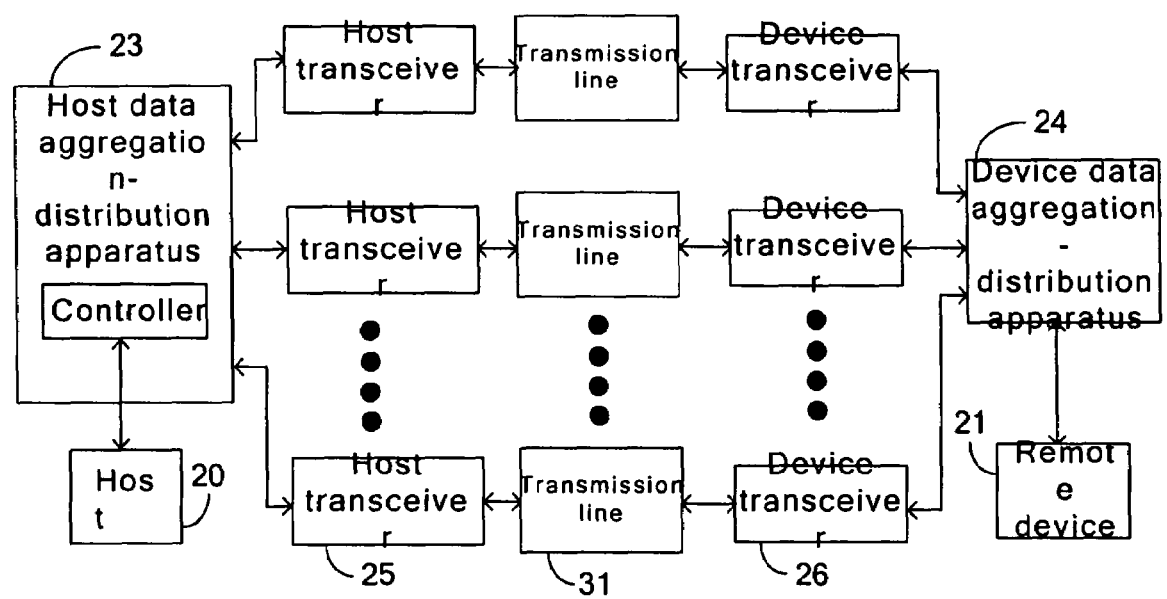
FIG. 3 presents a schematic diagram of a transmission system in accordance with a first preferred embodiment of the present invention.

Please refer to FIG. 3. FIG. 3 presents a schematic diagram of a transmission system in accordance with a first preferred embodiment of the present invention. As is shown in FIG. 3, each of the plurality of host transceivers 25 is electrically connected to one of the plurality of device transceivers 26 over one of a plurality of transmission lines 31. The host 20 is able to transmit data signals in the USB standard to the remote device 21 through the host data aggregation-distribution apparatus 23 over the plurality of transmission lines 31. In the same way, the remote device 21 is able to transmit data signals in the USB standard to the host 20 through the device data aggregation-distribution apparatus 24 over the plurality of transmission lines 31. Accordingly, the data transmission bandwidth between the host 20 and the remote device 21 can be increased based on the parallel-transmission technique shown in FIG. 3.

Figure 4:
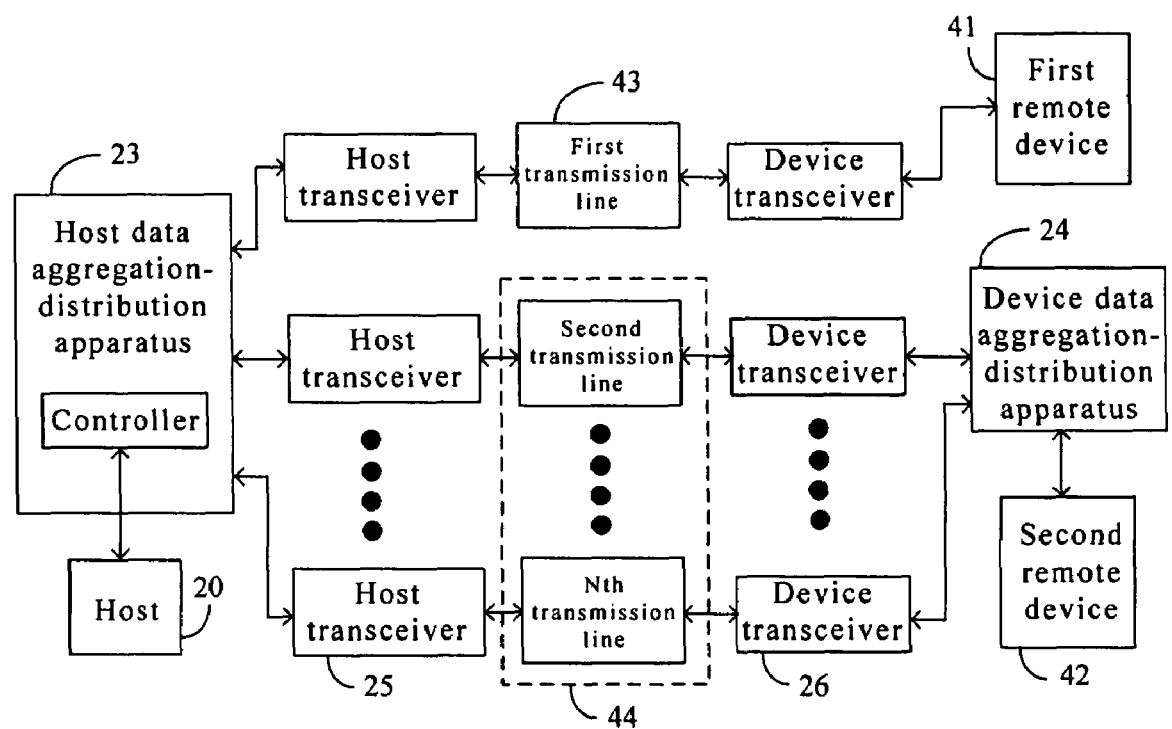
FIG. 4 presents a schematic diagram of a data aggregation-distribution system in accordance with a second preferred embodiment of the present invention.

Please refer to FIG. 4. FIG. 4 presents a schematic diagram of a data aggregation-distribution system in accordance with a second preferred embodiment of the present invention. As is shown in FIG. 4, the host 20 communicates with a first remote device 41 and a second remote device 42 for data transmission. The first remote device 41 is able to communicate with the host 20 only through a first transmission line 43 because the first remote device 41 is not equipped with a data aggregation-distribution apparatus 24. However, the second remote device 42 is able to communicate with the host 20 through a plurality of transmission lines 44 including transmission lines from a second transmission line to a Nth transmission line because the second remote device 42 is equipped with the data aggregation-distribution apparatus 24.

Taking an USB 2.0 standard for example, the corresponding data transmission rate reaches upper limit of 480 Mbps, and therefore the data transmission rate between the host 20 and the host data aggregation-distribution apparatus 23 can reach to N×480 Mbps. Accordingly, the data transmission rate between the host 20 and the first remote device 41 is limited to 480 Mbps, and the data transmission rate between the host 20 and the second remote device 42 can reach to (N−1)×480 Mbps.

Figure 5:
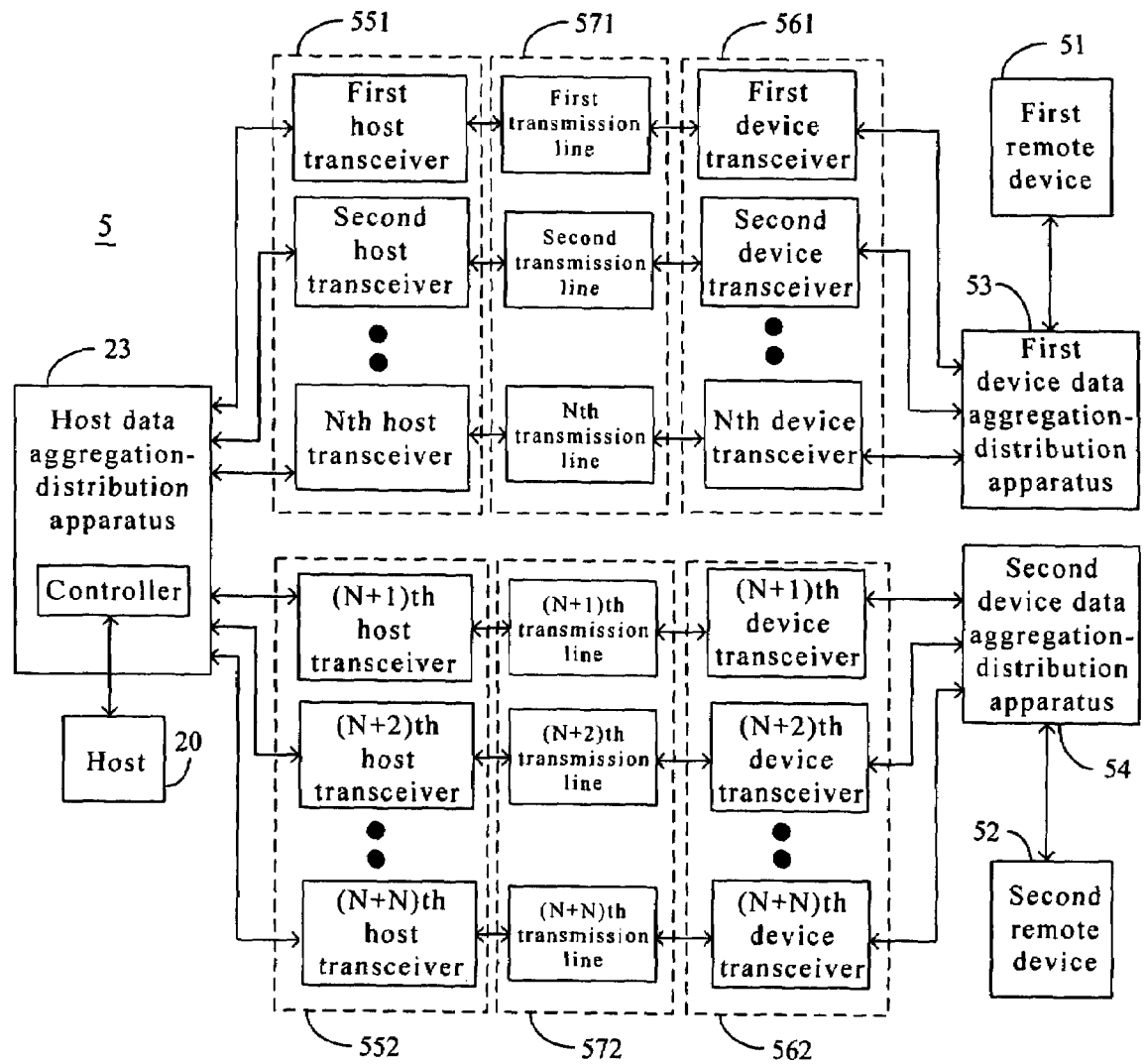
FIG. 5 presents a schematic diagram of a data aggregation-distribution system in accordance with a third preferred embodiment of the present invention.

Please refer to FIG. 5. FIG. 5 presents a schematic diagram of a data aggregation-distribution system 5 in accordance with a third preferred embodiment of the present invention. As is shown in FIG. 5, the host 20 communicates with a first remote device 51 and a second remote device 52 for data transmission. The first remote device 51 is equipped with a first device data aggregation-distribution apparatus 53 and the second remote device 52 is equipped with a second device data aggregation-distribution apparatus 54.

The first remote device 51 is able to transmit data signals in the USB standard to the host 20 by the first device data aggregation-distribution apparatus 53 through a first plurality of host transceivers 551 including host transceivers from a first host transceiver to a Nth host transceiver, a first plurality of transmission lines 571 including transmission lines from a first transmission line to a Nth transmission line, and a first plurality of device transceivers 561 including device transceivers from a first device transceiver to a Nth device transceiver. Similarly, the second remote device 52 is able to transmit data signals in the USB standard to the host 20 by the second device data aggregation-distribution apparatus 54 through a second plurality of host transceivers 552 including host transceivers from a (N+1)th host transceiver to a (N+N)th host transceiver, a second plurality of transmission lines 572 including transmission lines from a (N+1)th transmission line to a (N+N)th transmission line, and a second plurality of device transceivers 562 including device transceivers from a (N+1)th device transceiver to a (N+N)th device transceiver.

Figure 6:
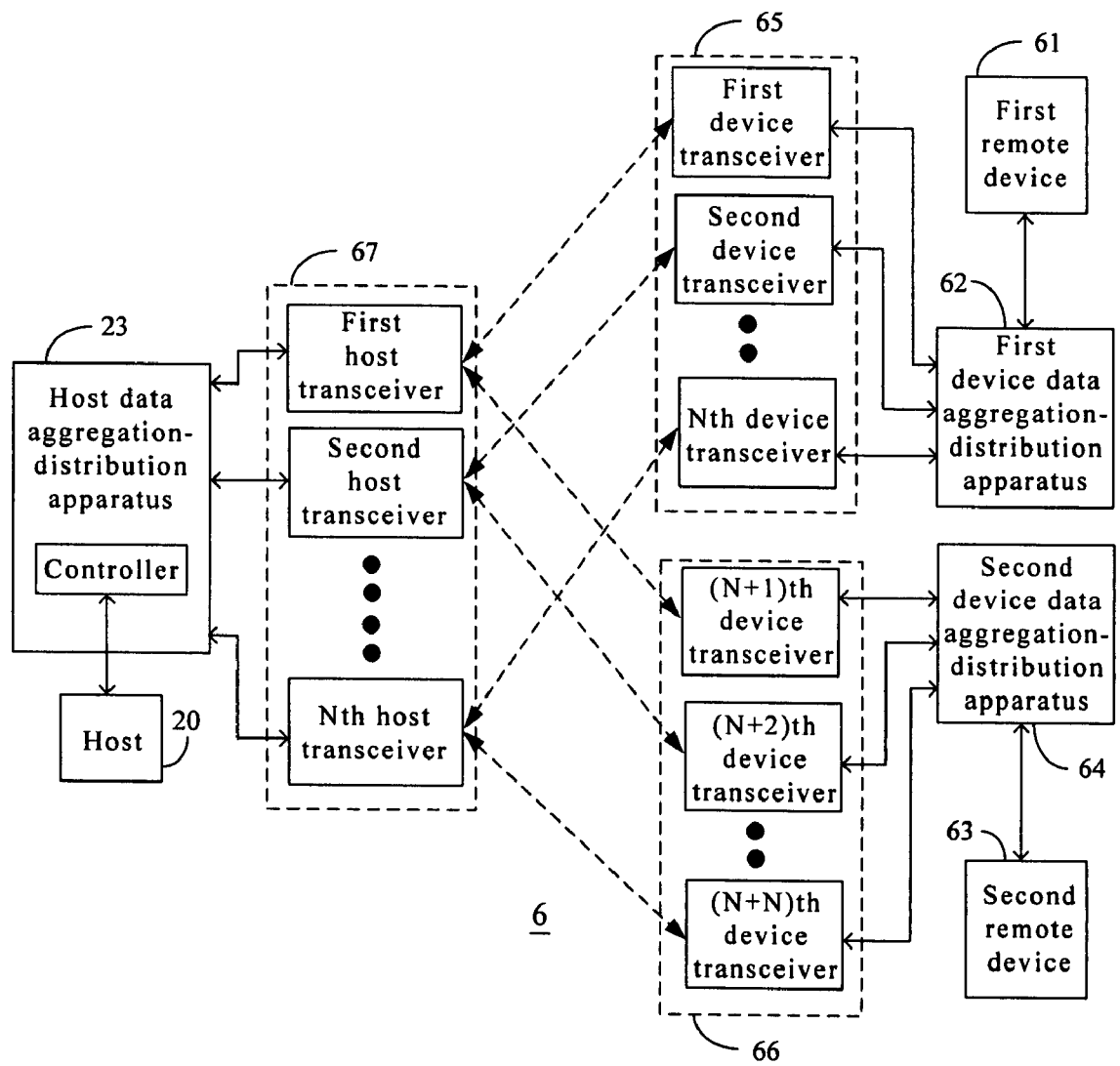
FIG. 6 presents a schematic diagram of a data aggregation-distribution system in accordance with a fourth preferred embodiment of the present invention.

Please refer to FIG. 6. FIG. 6 presents a schematic diagram of a data aggregation-distribution system 6 in accordance with a fourth preferred embodiment of the present invention. As is shown in FIG. 6, the host 20 communicates wirelessly with a first remote device 61 and a second remote device 62 for data transmission. The first remote device 61 is equipped with a first device data aggregation-distribution apparatus 62 and the second remote device 63 is equipped with a second device data aggregation-distribution apparatus 64.

The first remote device 61 is able to transmit data signals in the USB standard to the host 20 by the first device data aggregation-distribution apparatus 62 through a plurality of host transceivers 67 including host transceivers from a first host transceiver to a Nth host transceiver, a first plurality of device transceivers 65 including device transceivers from a first device transceiver to a Nth device transceiver, and N wireless logic transmission channels. Similarly, the second remote device 63 is able to transmit data signals in the USB standard to the host 20 by the second device data aggregation-distribution apparatus 64 through a plurality of host transceivers 67 including host transceivers from the first host transceiver to the Nth host transceiver, a second plurality of device transceivers 66 including device transceivers from a (N+1)th device transceiver to a (N+N)th device transceiver, and N wireless logic transmission channels.

Based on the forwarded descriptions, the host is able to communicate with a plurality of remote devices simultaneously for data transmission regardless of whether or not the plurality of remote devices are equipped to have functionality of data aggregation-distribution. Accordingly, the host data aggregation-distribution apparatus may further comprise a controller for controlling the processing of data signals received or to be transmitted by the data aggregation unit and the data distribution unit according to a detected arrangement of remote devices. Furthermore, the remote device can transmit two parallelized data sets having same data signals to the host through different wireless logic transmission channels so as to reduce error data rate if the data transmission between the remote device and the host is based on wireless communication.

Figure 7A:
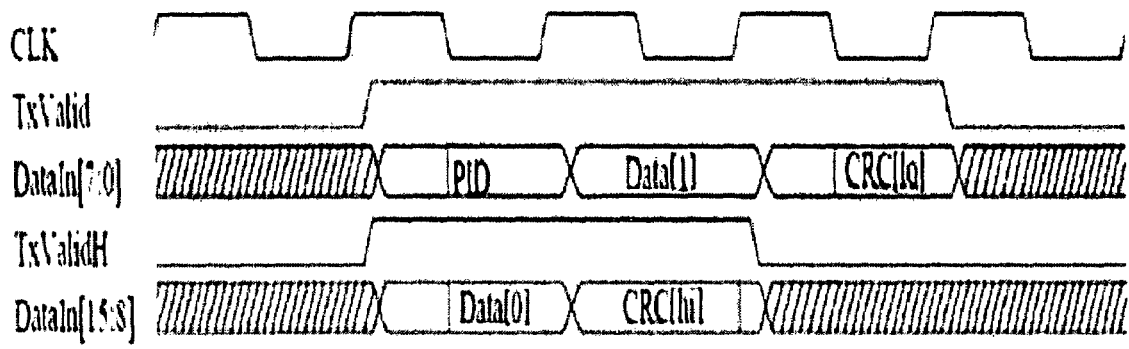
FIG. 7A presents exemplary transmission signals based on an USB standard.
Figure 7B:
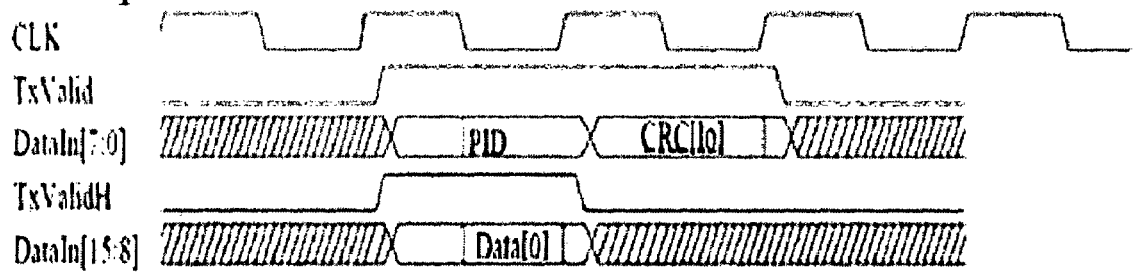
FIG. 7B presents exemplary distributed transmission signals based on an USB standard.
Figure 7B:
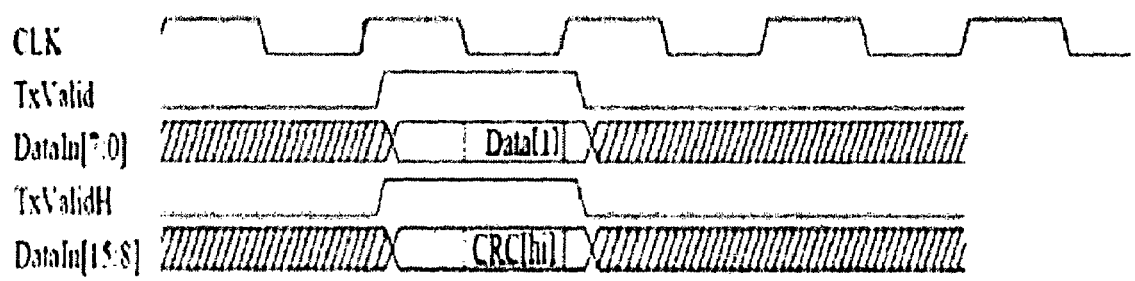

Please refer to FIG. 7A. FIG. 7A presents exemplary transmission signals based on the USB standard. As is shown in FIG. 7A, the signal CLK is a clock being used as a system clock, the signal DataIn[7:0] corresponds to a lower-significant bit stream of data signal to be transmitted, and the signal DataIn[15:8] corresponds to a higher-significant bit stream of data signal to be transmitted. The signal TxValid is utilized to specify whether there is data pending for transmittal. The level of the signal TxValid is high when there is data pending for transmittal. The PID shown in FIG. 7A is an identification parameter to identify a transmission target device. The CRC[lo] and CRC[hi] are data error correction codes. Please continue to refer to FIG. 7B. FIG. 7B presents exemplary distributed transmission signals based on the USB standard. As is shown in FIG. 7B, the data signal in FIG. 7A is separated and distributed into two parts as a first part and a second part. Both the first part and the second part are complied with the USB standard and are transmitted to a remote device having functionality of data aggregation-distribution through different transmission lines or wireless logic transmission channel.

Figure 8:
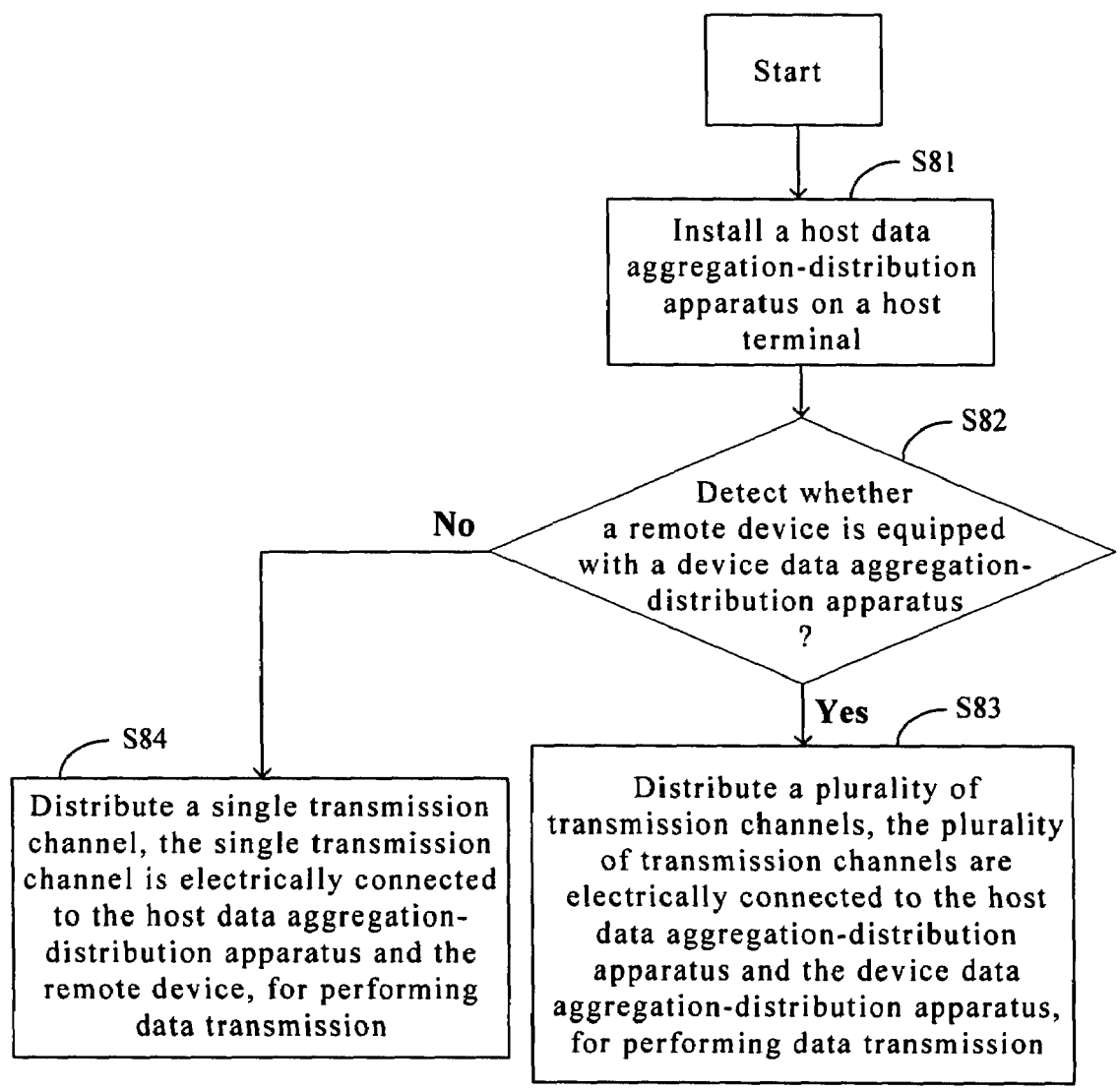
FIG. 8 presents a flowchart depicting a data aggregation-distribution method according to the present invention.

Please refer to FIG. 8. FIG. 8 presents a flowchart depicting a data aggregation-distribution method according to the present invention. The method in FIG. 8 comprises the following steps:

Step S81: installing a host data aggregation-distribution apparatus on a host terminal;

Step S82: detecting whether or not a remote device is equipped with a device data aggregation-distribution apparatus, if yes, then go to step S83, otherwise go to step S84;

Step S83: distributing a plurality of transmission channels, the plurality of transmission channels are electrically connected to the host data aggregation-distribution apparatus and the device data aggregation-distribution apparatus, for performing data transmission based on data aggregation-distribution processes; and Step S84: distributing a single transmission channel, the single transmission channel is electrically connected to the host data aggregation-distribution apparatus and the remote device, for performing data transmission based on the single transmission channel.

While the invention has been shown and described with respect to the preferred embodiments of the present invention, it will be understood by those skilled in the art that various changes and modifications may be made without departing from the spirit and scope of the invention as defined in the following claims.

What is claimed is:

1. A data aggregation-distribution apparatus, comprising:
    at least two port route units, wherein each of the port route units is coupled to a corresponding transceiver, wherein each of the corresponding transceivers transfers a data signal through a corresponding transmission channel from one or more remote device terminals; and
    a data processing unit, coupled to the transceivers, comprising:
        a data aggregation unit for receiving data signals from the transceivers,
        a data distribution unit for outputting input signals according to the data signals, and
        a receiving buffer and a transmitting buffer for storing signals temporarily if bandwidths associated with the transceivers are not the same, wherein the data processing unit is configured to detect whether or not each of the one or more remote device terminals is equipped with a corresponding aggregation-distribution apparatus;
    wherein the bandwidth of the data processing unit is larger than the bandwidth of each of the port route units, and at least one of the transceivers and the port route units is complied with a Universal Serial Bus (USB) standard.

2. The apparatus of claim 1 wherein the USB standard is an USB 2.0 standard or a wireless USB standard.

3. The apparatus of claim 2 wherein the transceivers are USB transceivers.

4. The apparatus of claim 1 wherein the operation frequency of the data processing unit is higher than or equal to the operation frequency of the port route units.

5. The apparatus of claim 1 wherein the transmission channels form a parallel path interface.

6. The apparatus of claim 1 wherein each of the interfaces between the port route units and their corresponding transceivers is one of Transceiver Macrocell Interface (UTMI) interface, UTMI+ interface, and ULPI (UTMI+ low-pin interface) interface.

7. The apparatus of claim 1 wherein the apparatus includes an interface controller.

8. The apparatus of claim 7 wherein the interface controller is one of an Enhanced Host Controller Interface (EHCI) controller, an Open Host Controller Interface (OHCI) controller, an Universal Host Controller Interface (UHCI) controller, and a Wireless Host Controller Interface (WHCI) controller.

9. The apparatus of claim 8 wherein each of the interfaces between the port route units and their corresponding transceivers is a Transceiver Macrocell Interface (UTMI) interface.

10. The apparatus of claim 7 wherein the interface controller is a WiMedia-MBOA (Multiband OFDM Alliance) controller.

11. The apparatus of claim 1 wherein at least one of the transmission channels is a wireless transmission channel.

12. The apparatus of claim 1 wherein the bandwidth of the data processing unit is equal to or larger than the sum of bandwidths of all the port route units.

13. The apparatus of claim 1 wherein one of the port route units comprises a receiving buffer and a transmitting buffer.

14. The apparatus of claim 1 wherein the data processing unit further comprises a controller for controlling different situations corresponding to different data aggregating and distributing arrangements.

15. The apparatus of claim 1 wherein based on detecting that one or more of the remote device terminals are equipped with a corresponding aggregation-distribution apparatus, a transmission protocol is selected for communicating with the one or more remote device terminals.

16. The apparatus of claim 15 wherein the transmission protocol is one of a predetermined transmission protocol and a commercialized transmission protocol.

17. A method for transferring data in a data transmission system, the data transmission system includes a first device and a second device, one of the first and the second devices comprising a first data aggregation-distribution apparatus, the method comprising:
    determining whether another one of the first and second devices is equipped with a second data aggregation-distribution apparatus and generating a detecting result;
    distributing at least one transmission channel according to the detecting result, wherein the at least one transmission channel is coupled between the first and the second devices; and
    transferring data from one of the first and second devices to another one of the first and second devices over the at least one transmission channels.

18. The method of claim 17 wherein the at least one transmission channel is a transmission line or a wireless transmission channel.

19. The method of claim 17 wherein the host data aggregation-distribution apparatus communicates with the host for data transmission through an USB interface.

20. The method of claim 17 wherein the first device comprises a plurality of transceivers, and at least one of the transceivers is complied with a Universal Serial Bus (USB) standard.

* * * * *